US012056078B2

(12) United States Patent
Zou et al.

(10) Patent No.: US 12,056,078 B2
(45) Date of Patent: Aug. 6, 2024

(54) ADDRESSING MULTIPHASE POWER STAGE MODULES FOR POWER STATE AND THERMAL MANAGEMENT

(71) Applicant: SEMICONDUCTOR COMPONENTS INDUSTRIES, LLC, Phoenix, AZ (US)

(72) Inventors: Han Zou, Gilbert, AZ (US); Owen Cregg, Clarinbridge (IE); Margaret Spillane, Limerick (IE); Paul J. Harriman, Belfair, WA (US); Kevin Kelliher, Coolflugh (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 13 days.

(21) Appl. No.: 17/815,995

(22) Filed: Jul. 29, 2022

(65) Prior Publication Data

US 2024/0037057 A1 Feb. 1, 2024

(51) Int. Cl.
*G06F 13/42* (2006.01)
*H02M 3/15* (2006.01)
*H02M 3/158* (2006.01)

(52) U.S. Cl.
CPC ...... *G06F 13/4282* (2013.01); *H02M 3/1586* (2021.05); *G06F 2213/0002* (2013.01)

(58) Field of Classification Search
CPC ........ G06F 2213/0002; G06F 13/4282; H02M 3/1586
See application file for complete search history.

(56) References Cited

U.S. PATENT DOCUMENTS

| 8,631,179 B1* | 1/2014 | Faulds | G06F 13/364 |
| | | | 710/110 |
| 2018/0267916 A1* | 9/2018 | Mishra | G06F 13/4282 |
| 2018/0364784 A1* | 12/2018 | Luo | G06F 1/3287 |
| 2019/0064910 A1* | 2/2019 | Wang | G06F 1/3215 |
| 2021/0124696 A1* | 4/2021 | Aichriedler | G06F 7/588 |

(Continued)

OTHER PUBLICATIONS

Analog Devices, Inc., "MAXX77540, 16VIN/6A, Dual-Phase High-Efficiency Buck Converter", Rev. 2, Apr. 2022.

(Continued)

*Primary Examiner* — Henry Tsai
*Assistant Examiner* — Harry Z Wang
(74) *Attorney, Agent, or Firm* — Brake Hughes Bellermann LLP

(57) ABSTRACT

A power stage configured for assigning each phase a unique address is disclosed. In particular, the disclosed power stage includes temporarily using a dedicated pulse width modulation (PWM) connection between a controller and a phase to assign a unique address to the phase. Then, after the assignment, the PWM connection may be returned to use for regulation, while the phases can communicate over a common communication bus using their assigned addresses. This addressed communication can be used to control a power state of all phases, all phases of a particular rail, or a particular phase. Controlling the power state with addressed commands communicated over a communication bus can help reduce the current consumed by the power stage during light load conditions or sleep states.

20 Claims, 7 Drawing Sheets

(56) References Cited

U.S. PATENT DOCUMENTS

2022/0300019 A1* 9/2022 Lawange ............... H03M 1/72

OTHER PUBLICATIONS

Linear Technology, "LTC3445, 12C Controllable Buck Regulator with Two LDOs in a 4mmx4mm QFN", Rev. A, 2004.
Renesas Electronics Corporation, "ISL99380R5935, ISL99380BR5935, 80A Smart Power Stage (SPS) Module with Integrated High Accuracy Current and Temperature Monitors," Oct. 6, 2020.
Infineon, "TDA21472 Optimos Powerstage," Rev. 2.0, Nov. 2, 2020.

* cited by examiner

ADDRESSING MULTIPHASE POWER STAGE MODULES FOR POWER STATE AND THERMAL MANAGEMENT

FIELD OF THE DISCLOSURE

The present disclosure relates to power electronics and more specifically to communication between a controller and voltage regulation modules in a multiphase power stage.

BACKGROUND

A load may be coupled to a rail for power. The power drawn by a load (e.g., a processor) may change over time as its operating requirements change. Distributing the power delivery requirements over multiple phases may correspond to higher efficiency and better thermal performance for each phase. Each phase may receive pulse width modulation (PWM) signals from a control module to supply a voltage and a current to a rail. The PWM signal at each phase may be adjusted to distribute the power delivery requirements.

SUMMARY

In some aspects, the techniques described herein relate to a method for communication in a multiphase power stage, the method including: transmitting a setup message from a controller to a plurality of driver modules using serial communication over a communication bus; configuring, in response to the setup message, the plurality of driver modules to temporarily receive serial communication over respective pulse width modulation (PWM) lines between the controller and the plurality of driver modules; receiving, at a first driver module, a first address message from a first PWM line, the first address message including a first address; and receiving, at a second driver module, a second address message from a second PWM line, the second address message including a second address.

In some aspects, the techniques described herein relate to a method, further including: configuring the first driver module to use the first address for serial communication over the communication bus; and configuring the second driver module to use the second address for serial communication over the communication bus.

In some aspects, the techniques described herein relate to a method, wherein the setup message includes a default address used by the plurality of driver modules.

In some aspects, the techniques described herein relate to a method, wherein: configuring the first driver module to use the first address for serial communication over the communication bus includes replacing the default address stored at the first driver module with the first address; and configuring the second driver module to use the second address for serial communication over the communication bus includes replacing the default address stored at the second driver module with the second address.

In some aspects, the techniques described herein relate to a method, further including: transmitting an acknowledgement signal from the first driver module and the second driver module to the controller, the acknowledgement signal indicating that the first address and the second address were received at the first driver module and the second driver module respectively.

In some aspects, the techniques described herein relate to a method, wherein the communication bus includes a data line and a clock line.

In some aspects, the techniques described herein relate to a method, further including: transmitting a clock signal on the clock line of the communication bus; and transmitting the first address message to the first PWM line and the second address message to the second PWM line in parallel according to the clock signal.

In some aspects, the techniques described herein relate to a method, wherein: the first address includes a sequence of address bits unique to the first driver module followed by a sequence of check-code bits; and the second address includes a sequence of address bits unique to the second driver module followed by the sequence of check-code bits.

In some aspects, the techniques described herein relate to a multiphase power stage including: a communication bus including a data line and a clock line; a first driver module coupled to the data line at a first data pin and coupled to the clock line at a first clock pin; a second driver module coupled to the data line at a second data pin and coupled to the clock line at a second clock pin; and a controller, coupled to the communication bus, coupled to a first PWM pin of the first driver module, and coupled to a second PWM pin of the second driver module, the controller configured by instructions to: transmit a setup message over the communication bus to the first driver module and the second driver module, the setup message configuring the first driver module and the second driver module to receive serial communication at the first PWM pin and the second PWM pin respectively; and transmit, simultaneously, a first address message to the first PWM pin of the first driver module and a second address message to the second PWM pin of the second driver module.

In some aspects, the techniques described herein relate to a multiphase power stage, wherein the controller is further configured to: transmit a clock signal to the clock line of the communication bus while transmitting the first address message and a second address message, the first address message and the second address message being synchronous with the clock signal.

In some aspects, the techniques described herein relate to a multiphase power stage, wherein the controller is further configured to: receive, after transmitting the first address message and the second address message, an acknowledgement signal transmitted from the first driver module and the second driver module to the data line of the communication bus.

In some aspects, the techniques described herein relate to a multiphase power stage, wherein the acknowledgement signal is based on a check code in the first address message received by the first driver module and on the check code in the second address message received by the second driver module.

In some aspects, the techniques described herein relate to a power stage, including: a plurality of rails, each rail supplied by a plurality of driver modules, the plurality of driver modules configured to communicate over a communication bus according to a default address at a start of an address assignment process; and a controller coupled directly to respective pulse width modulation (PWM) pins of a plurality of driver modules, the controller configured by instructions to: transmit a setup message over a communication bus addressed to a default address to configure the plurality of driver modules to temporarily receive data at a PWM pin of each driver module; and transmit an address message to the plurality of driver modules at the PWM pin of each driver module to configure each driver module to communicate with the controller on the communication bus at an end of the address assignment process according to a unique address for each driver module.

In some aspects, the techniques described herein relate to a power stage, wherein the unique address includes at least one bit to indicate receipt by all of the plurality of driver modules of all of the plurality of rails.

In some aspects, the techniques described herein relate to a power stage, wherein the unique address includes at least one bit to indicate receipt by all driver modules of a particular rail.

In some aspects, the techniques described herein relate to a power stage, wherein the unique address includes at least one bit to indicate receipt by a particular driver module of a particular rail.

In some aspects, the techniques described herein relate to a power stage, wherein a first driver module and a second driver module of the plurality of driver modules are coupled at respective PWM pins to one PWM port of the controller, the first driver module including a strapping resistor configured to generate a voltage at a low-side gate pin.

In some aspects, the techniques described herein relate to a power stage, wherein the unique address includes a strapping bit corresponding to the voltage at the low-side gate pin of the first driver module.

In some aspects, the techniques described herein relate to a power stage, wherein the controller is further configured to, after the end of the address assignment process: communicate, based on the unique address for each driver module, commands that are addressed: globally to all driver modules of the plurality of driver modules; selectively to driver modules of a particular rail of the plurality of rails; or individually to a particular driver module of the plurality of driver modules.

In some aspects, the techniques described herein relate to a power stage, wherein the commands include a sleep command to configure at least one driver module in a SLEEP state, wherein in the SLEEP state, switching circuitry of the at least one driver module is inactive.

In some aspects, the techniques described herein relate to a power stage, wherein the commands include a wake command to configure the at least one driver module from the SLEEP state to an ON state, wherein in the ON state, switching circuitry of the at least one driver module is active.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure describes systems and methods for communication between a controller and phases of a multiphase power stage. Hardwiring each phase to have a unique address to communicate with the controller can be problematic because it can severely limit the versatility of the phases and the topology of the power stage. Assigning each phase a unique address for communication at startup is a better approach but still has problems. For example, often cost, complexity, and size limitations prevent the power stage from having the complexity (e.g., pin count) necessary to communicate directly between the controller and each phase. The disclosed approach solves these problems by assigning each phase a unique address without increasing the complexity of the power stage. In particular, the disclosed approach includes temporarily using a dedicated pulse width modulation (PWM) connection to assign a unique address to each phase. Then, after the assignment, the PWM connection may be returned to use for PWM signals for voltage regulation, while the phases can communicate over a common communication bus using their assigned unique address.

The present disclosure further describes a method for power mode adjustment using the addressed communication between the controller and each phase. The method provides enhanced control which can reduce system losses (e.g., phase quiescent current) in a certain power mode (e.g., sleep mode) without affecting the performance (e.g., turn ON time) of the multiphase power stage. For example, being able to enable/disable each phase with addressed commands can reduce a quiescent current consumed in a phase because it does not have to consume a current to support an enable signal at an enable pin, which could be HIGH even while the phase is deactivated.

Figure 1:
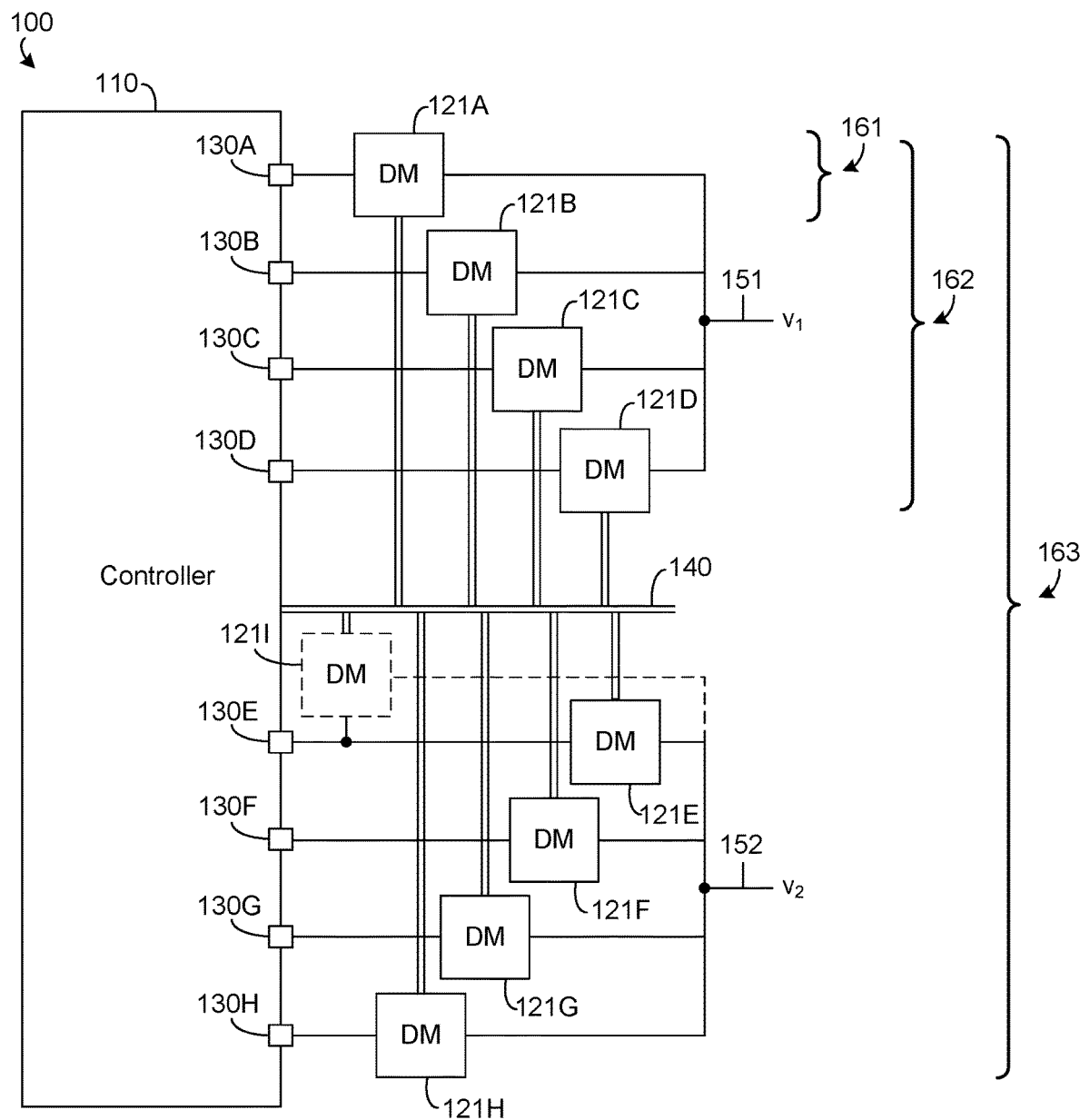
FIG. 1 is a block diagram of a power stage according to a possible implementation of the present disclosure.

FIG. 1 illustrates a multiphase power stage according to an implementation of the present disclosure. The multiphase power stage 100 (i.e., voltage core, core supply, core, etc.) is configured to output one or more voltages at one or more rails. For the implementation shown, the multiphase power stage 100 includes a first voltage ($V_1$) at a first rail 151 and a second voltage ($V_2$) at a second rail 152. A load coupled to a rail can receive the voltage for power in a system. For example, a rail may supply a voltage to a processor in a laptop computer. The voltage at each rail is regulated so that it does not change significantly with changes in a condition of the load (i.e., load condition). However, the current at each rail can change to satisfy the load condition. For example, load in a heavier load condition may draw more current than a load in a lighter load condition.

Each rail may be supplied with multiple phases to meet the current requirements of a load condition. What is more, the output of the phases may be adjusted so that the efficiency of the power stage is maximized as load conditions change. For example, one phase feeding the rail may supply all the power necessary in a light load condition, and to increase efficiency in this condition, all but this one phase may be disabled. Disabling phases in response to changing load conditions and/or thermal conditions may be referred to as phase shedding.

As shown in FIG. 1, the first rail 151 is supplied by a first set of phases 121A-D and the second rail 152 is supplied by a second set of phases 121E-H. Each phase of the multiphase power stage 100 may be implemented as a driver module (i.e., voltage-regulator (VR) module) configured to output a phase voltage and a phase current based on a pulse width modulation (PWM) signal received at a PWM pin of the driver module. Accordingly, the multiphase power stage 100 further includes a controller 110 (i.e., VR controller), that is configured to output a plurality of PWM signals at a plurality of PWM ports (i.e., PWM pins) to control the rail voltage/current according to a load condition. For example, to control the first rail 151, the controller 110 includes a first PWM port 130A to output a first PWM signal to a first PWM pin of a first driver module 121A, a second PWM port 130B to output a second PWM signal to a second PWM pin of a second driver module 121B, a third PWM port 130C to output a third PWM signal to a third PWM pin of a third driver module 121C, and a fourth PWM port 130D to output a fourth PWM signal to a fourth PWM pin of a fourth driver module 121D. The connections for the second rail 152 may be similarly described. For example, to control the second rail 152, the controller 110 includes a fifth PWM port 130E to output a fifth PWM signal to a fifth PWM pin of a fifth driver module 121E, a sixth PWM port 130F to output a sixth PWM signal to a sixth PWM pin of a sixth driver module 121F, a seventh PWM port 130G to output a seventh PWM signal to a seventh PWM pin of a seventh driver module 121G, and a eighth PWM port 130H to output a eighth PWM signal to a eighth PWM pin of a eighth driver module 121H.

The connections (e.g., wires, traces, etc.) between the PWM pins of the driver modules 121A-H and the PWM ports 130A-H of the controller may be referred to as PWM lines. For regulation, PWM signals can be transmitted to the driver modules 121A from the controller 110 over the PWM lines. These PWM signals for regulation may alternate between ON (i.e., HIGH) and OFF (i.e., LOW) according to a duty cycle that can be adjusted based on feedback from a load (not shown). To turn OFF a phase output, a PWM signal for the phase may be set at a level between the HIGH and LOW levels (i.e., MID level).

As shown in FIG. 1, the controller 110 and the driver modules 121A-H may also be coupled together (i.e., communicate over) a communication bus 140. The communication bus may include a data line and a clock line to support serial communication. In serial communication, a clock signal on the clock line alternates according to a clock frequency so that bits of data can be sequentially sent over the data line in time slots synchronized with the clock signal. Accordingly, this form of serial communication may be referred to as synchronous.

As shown in FIG. 1, the communication bus 140 is shared by all driver modules 121A-H. Accordingly, each driver module may be assigned an address for communication over the communication bus. The address enables a driver module to receive messages sent from the controller addressed to the driver module and ignore messages sent from the controller not addressed to the driver module. Further, the address enables the controller to identify return messages as sent from the driver module. The address may be configured so that the controller may transmit a message to one or more of the driver modules 121A-H based on the bits of the address. For example, based on the address, the controller 110 may send a global message to all phases 163 of the multiphase power stage 100; a rail message to all phases of one rail 162 of the multiphase power stage 100; and/or a phase message sent to a particular driver module 161 of the multiphase power stage 100.

Communication between the controller 110 and the driver modules 121A-H over the communication bus 140 may be advantageous for, at least, the reason that messages can be used to enabled/disabled driver modules as a load requires. For example, a controller may communicate a command to disable one or more driver modules to lower a quiescent current drawn by the multiphase power stage 100 when a system goes into a sleep mode (i.e., sleep state). The controller 110 may later communicate a command to enable the one or more driver modules to reactivate after the system returns to a wake mode (i.e., wake state, ON state).

The present disclosure is not limited to the implementation shown in FIG. 1 and may include any number of rails, each supplied by any number of phases. Further, it is possible that two driver modules can be coupled to a single PWM port of the controller 110 to receive the same PWM signal at respective PWM pins. For example, as shown in FIG. 1, a driver module 121I may be coupled, with the fifth driver module 121E, to the fifth PWM port 130E to receive the fifth PWM signal. In general, any two driver modules connected at their respective PWM pins to one PWM port of the controller may be referred to as parallel driver modules.

Figure 2:
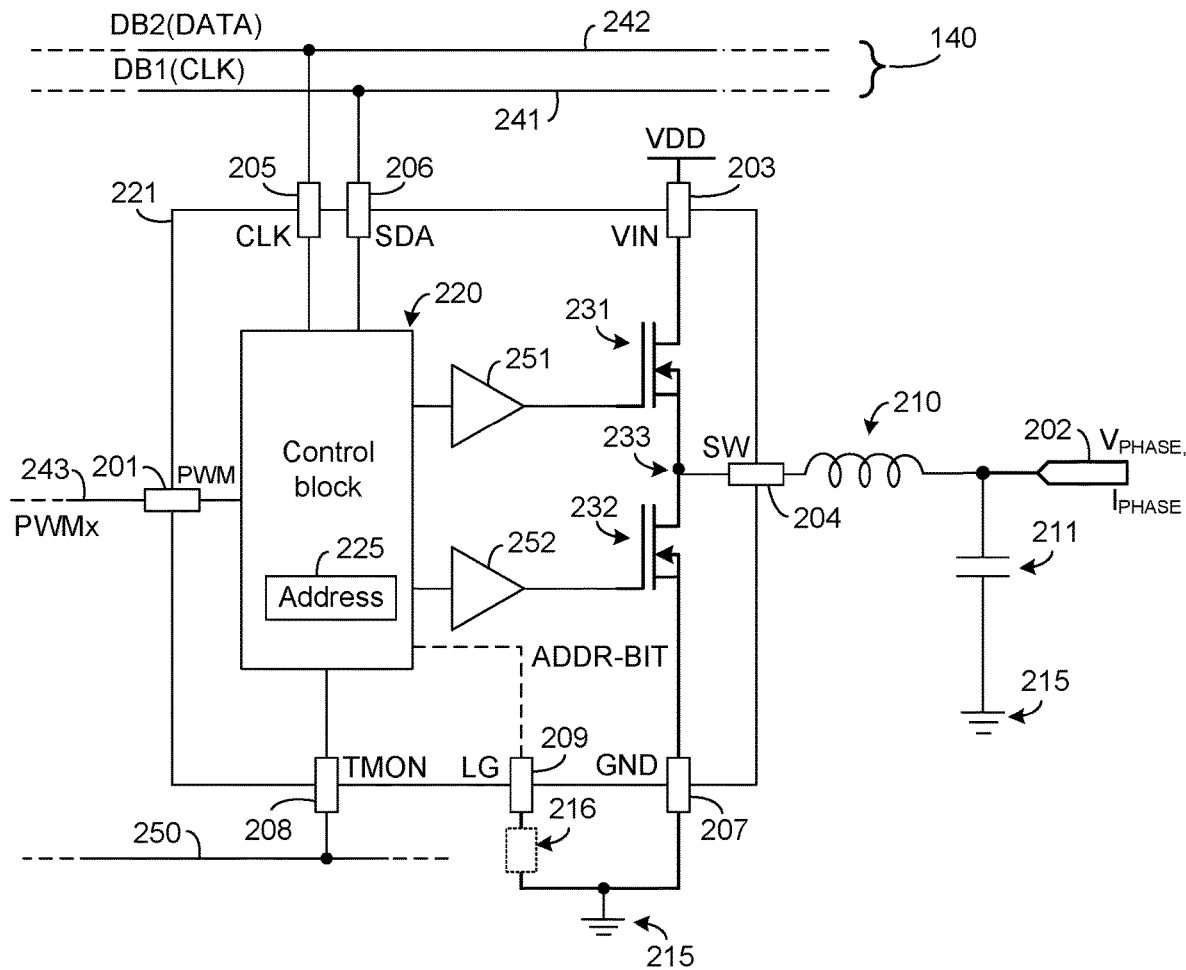
FIG. 2 is a block diagram schematically illustrating a driver module according to a possible implementation of the present disclosure.

FIG. 2 schematically illustrates a driver module according to an implementation of the present disclosure. As shown, the driver module includes drivers and transistors integrated within the same semiconductor package. The transistors can be metal oxide semiconductor field effect transistors (i.e., MOSFETs). As a result, this type of driver module can be referred to as a driver MOS (i.e., DrMOS). In the disclosure, the terms driver module, DrMOS, and voltage regulation module may be used interchangeably.

The driver module 221 may be configured to operate as a power converter configured to receive an input voltage ($V_{DD}$) at an input pin 203 ($V_{IN}$) and to output a phase voltage ($V_{PHASE}$) at a rail 202. For example, the driver module 221 may be configured as a synchronous buck converter having an output voltage ($V_{PHASE}$) that is less than its input voltage ($V_{DD}$). The synchronous buck converter operates by alternatively coupling (i.e., switching) a switch node 233 at a switch-node pin 204 (SW) to the input voltage ($V_{DD}$), received at the input pin 203 ($V_{IN}$), and a ground 215, received at a ground pin 207 (GND), according to a binary PWM signal received at a PWM pin 201 of the driver module 221. The PWM signal is transmitted from the controller (not shown) to the driver module 221 over a PWM line 243, which couples the PWM pin 201 to a respective PWM port of the controller (not shown). The alternating coupling of the switch node can sequentially charge and discharge an inductor 210 so that a voltage at a capacitor 211 is maintained at a regulated level. The duty cycle of the PWM signal can be adjusted to change the amounts of charging and discharging for each cycle of the PWM signal (i.e., each PWM cycle) in order to maintain the voltage at a relatively fixed level despite changes in a load coupled to the rail 202.

As shown in FIG. 2, the driver module 221 includes a control block 220 that includes the logic circuitry and the memory circuitry necessary to provide high-side switching signals to a high-side amplifier 251 that drives a gate of a high-side transistor 231 and to provide low-side switching signals to a low-side amplifier 252 that drives a gate of a low-side transistor 232 in order to perform the switching necessary for power conversion.

As shown in FIG. 2, the driver module 221 further includes a clock pin 205 (CLK) coupled to a clock line 241 of a communication bus 140. The clock line (i.e., DB1, CLK) is configured to carry a clock signal transmitted from a controller (not shown) for serial communication. The driver module 221 further includes a data pin 206 (SDA) coupled to a data line 242 of the communication bus 140. The data line (DB2, DATA) is configured to carry data (e.g., messages) transmitted from the controller (not shown) to the driver module 221 or to carry data transmitted from the driver module 221 of the controller. In other words, the communication bus 140 can provide a bi-directional communication interface between the driver module 221 and the controller (or other devices coupled to the communication bus 140). The communication bus 141 may be configured to carry synchronous, packet switched, serial communication supported by various communication protocols (e.g., I²C, SMBus, etc.).

The control block 220 may be configured to code and decode messages transmitted/received from the communication bus 140 using an address stored at the driver module 221 (e.g., in an address register 225). At the time of fabrication, the address register 225 may be set (e.g., factory set) to a default address. For use, the default address may be replaced in the address register with a unique address. The controller may perform an address-assignment process (i.e., address assignment) to assign or change addresses stored in the address register 225 of each driver module 221 in a power stage. The controller may be triggered to perform the address assignment automatically (e.g., at startup) or manually (e.g., by a user). During the address assignment regulation may be paused while the addresses are assigned.

In some implementations, the control block 220 may further include circuitry configured to measure a temperature of the phase and transmit this temperature to a temperature monitor pin 208 ($T_{MON}$). The temperature monitor pin 208 may be coupled to a temperature bus 250. The temperature bus 250 can be used to communicate analog signals corresponding to temperatures. In other words, the communication bus 140 may be a bus for communicating digital signals while the temperature bus 250 may be a bus for communicating analog signals.

In some implementations a resistor 216 (i.e., strapping resistor) may be coupled between the low-side gate pin 209 (LG) and the ground 215. The resistor 216 (i.e., strapping resistor) can provide a pull-up voltage (i.e., strapping voltage) at the low-side gate pin 209 that can be decoded as an address bit by the control block 220. A look-up table (i.e., LUT) or threshold may be used to decode a voltage at the low-side gate pin 209 as one or more address bits for an address of the driver module 221. For example, a higher strapping voltage (e.g., voltage above a threshold) may be interpreted by the control block as a bit value of 1 and a lower voltage (e.g., voltage below the threshold) may be interpreted by the control block 220 as a bit value of 0. Accordingly, a message received having an address bit corresponding to the decoded address bit may be recognized. This aspect will be described in further detail later.

Figure 3:
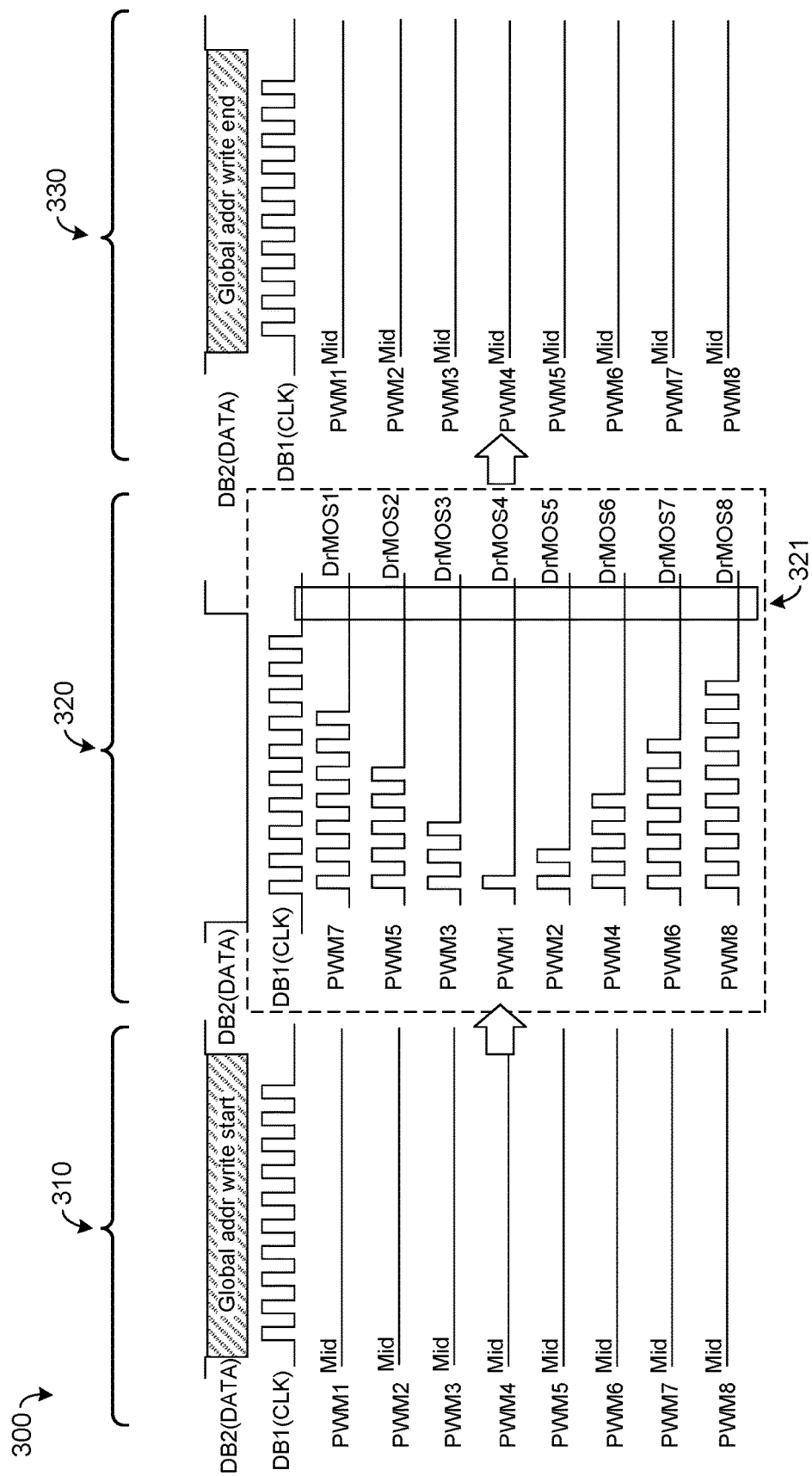
FIG. 3 illustrates signals in an address assignment process for driver modules of the power stage shown in FIG. 1 according to a possible implementation of the present disclosure.

FIG. 3 illustrates signals in an address assignment process 300 for driver modules of the power stage shown in FIG. 1 according to a possible implementation of the present disclosure. The signals include data signals (DATA) communicated over a data line 242 (DB2) of the communication bus 140 and a clock signal (CLK) communicated over a clock line 241(DB1) of the communication bus 140. The signals further include PWM signals communicated over a first PWM line (PWM1), a second PWM line (PWM2), a third PWM line (PWM3), a fourth PWM line (PWM4), a fifth PWM line (PWM5), a sixth PWM line (PWM6), a seventh PWM line (PWM7), and an eight PWM line (PWM8).

The address assignment process 300 may include an initialization phase 310 (i.e., setup phase, enter phase). The initialization phase 310 includes transmitting a MID level PWM signal over the PWM lines (PWM1-5) to respective PWM pins of the driver modules of multiphase power stage 100. In each driver module 221, a MID level PWM signal received at the PWM pin 201 can turn OFF the high-side transistor 231 and the low-side transistor 232 to decouple the driver module 221 from the rail 202.

The initialization phase 310 further includes transmitting a setup message (WRITE START) from the controller to the plurality of driver modules (e.g., all driver modules) over the data line 242 (DB2) of the communication bus 140 in synchrony with a clock signal (CLK) transmitted over the clock line 241(DB1). The setup message may include a global address so that it can be received by all driver modules of the multiphase power stage 100. The global address may include a default address that each driver module 221 is set to. For example, each driver module may be programmed at the time of fabrication (e.g., factory set) to communicate with a default address.

The setup message received by the plurality of driver modules may configure the plurality of driver modules to temporarily receive messages normally communicated over the communication bus 140 at respective PWM pins. For example, a setup message received by the driver module 221 of FIG. 2 can cause the driver module 221 to start receiving serial communication over the PWM line 243 (PWMx) and the clock line 241 (DB1) instead of the data line 242 (DB2) and the clock line 241 (DB1). In other words, the setup message may configure a driver module to stop receiving data (e.g., messages) at the data pin 206 (SDA) and start receiving data (e.g., messages) that the PWM pin 201 (PWM). The data received at the PWM pin 201 remains synchronous with the clock signal (CLK) received at the clock pin 205.

The assignment process shown in FIG. 3 further includes an assignment phase 320. The assignment phase 320 can include turning OFF the data line 242 (DB2) by sending a LOW signal. The assignment phase can further include transmitting a clock signal (CLK) over the clock line 241 (DB1) and transmitting address messages to one or more (e.g., all) of the driver modules. As shown, each address message may include multiple bits set to either a 1 (i.e., HIGH) or 0 (i.e., LOW). The reception of each bit is based on the clock signal so an address message may be received at a driver module one bit at a time until all bits of the address are received. The address messages to each driver module may be transmitted simultaneously according to the clock signal that is received over the shared communication bus. In other words, because the address messages are transmitted in parallel, all driver modules may receive respective address messages in the time (i.e., clock cycles) it takes for one driver module to receive its address message.

As shown, each address message may include an address for the driver module that is unique. The address for a driver module may include one or more bits to identify that it is a driver module of the power stage (i.e., global address bit(s)). The address for the driver module may further include one or more bits to identify that is it a driver module of a particular rail of the power stage (i.e., rail address bits(s)).

The address for the driver module may further include bits to identify that is it a particular driver module (i.e., per phase bits(s)).

The assignment phase 320 may further include an acknowledgement period 321 during which the driver modules may collectively respond over the data line 242 (DB2) that they have received their address message. For example, a number of clock cycles after transmitting the addresses messages, the controller may monitor the data line 242 of the communication bus 140 for one or more clock cycles in an acknowledgement period. If, during the acknowledgement period, any of the driver modules pulls the data line 242 (DB2) LOW, then the controller may be configured to resend the address or take another action (e.g., generate an alert) because the LOW signal can indicate that one or more of the driver modules has not received the address message properly. Conversely if, during the acknowledgement period, the data line 242 remains HIGH, then the controller may be configured to conclude that all address messages have been received and the address assignment process 300 may enter an exit phase 330.

The exit phase 330 of the address assignment process 300. The exit phase 330 includes transmitting a MID level PWM signal over the PWM lines (PWM1-5) to respective PWM pins of the driver modules of multiphase power stage 100 to decouple the driver modules from their respective rail(s).

The initialization phase 310 further includes transmitting a stop message (WRITE END) from the controller to the plurality of driver modules (e.g., all driver modules) over the data line 242 (DB2) of the communication bus 140 in synchrony with a clock signal (CLK) transmitted over the clock line 241(DB1). The stop message may include a global address so that it can be received by all driver modules of the multiphase power stage 100. The global address may include one or more address bits to indicate that it is for all driver modules.

Figure 4:
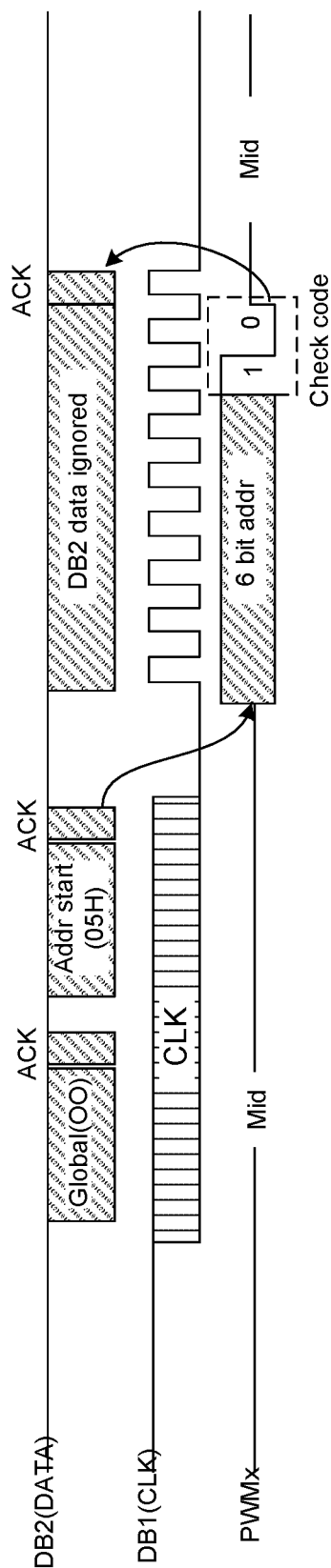
FIG. 4 illustrates possible signals during an address assignment process according to a possible implementation of the present disclosure.

FIG. 4 illustrates possible signals during an address assignment process according to a possible implementation of the present disclosure. The figure illustrates a timing of a global address write command with one slave address byte, one command byte, one data byte (i.e., payload). A driver module can read the address message byte from a PWM line (PWMx). The address message includes a 6-bit address of the driver module and a 2 bit check code (i.e., "10"). The check code may be used for an acknowledgement of the address receipt. If a driver module can successfully receive "10" in the last two bits of the address message, then the driver module may be configured to generate an acknowledgement signal (ACK) on the data line (DB2) having a level (e.g., HIGH) that corresponds to a successful address assignment. The acknowledgement signal (ACK) signal after the payload (i.e., 6-bit address) will be pulled high only when every driver module has received its 6-bit address correctly, as determined by check code matching.

Figure 5:
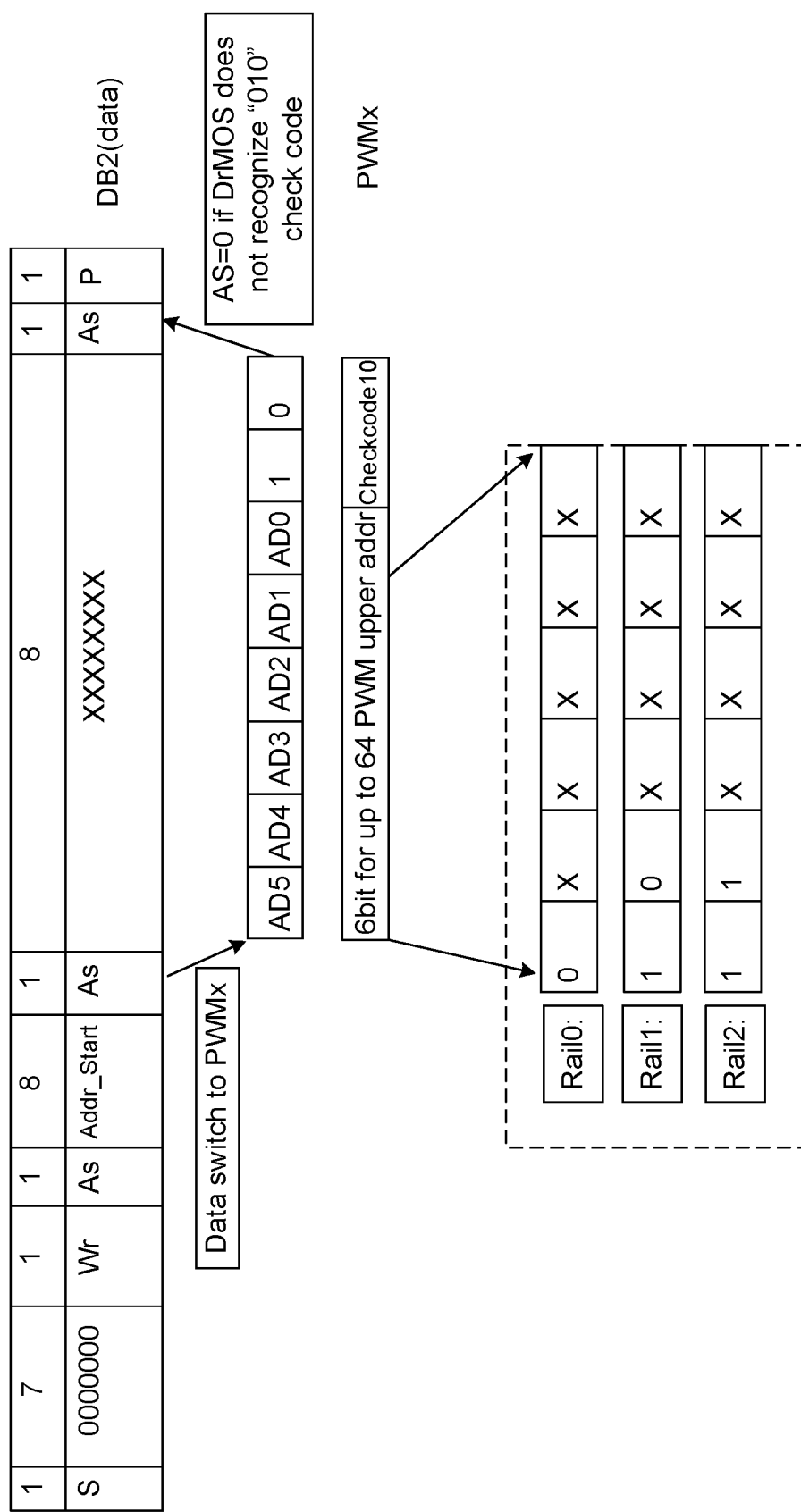
FIG. 5 illustrates detailed bit information of a communication for address assignment according to a possible implementation of the present disclosure.

FIG. 5 illustrates detailed bit information of a communication for address assignment according to a possible implementation of the present disclosure. As shown, after a start bit (S) and a number (i.e., 7 bits) of timing bits (0000000), a write bit (Wr) is sent to tell a driver module that what follows should be written. After these bits are acknowledged by an acknowledgement bit (As), an 8-bit address start message is sent to notify the receiver that what follows will be an address. After the address start message is acknowledged (As), an 8-bit address is sent over the PWM line. After the 8-bit address is acknowledged by a 1-bit acknowledgement message (As), a stop bit (P) is sent.

As shown in FIG. 5 the 8-bit address can include 6-bits (AD5, AD4, AD3, AD2, AD1, AD0) for identifying the sender/recipient and sequence of check-code bits (i.e., check code). The check code can be a 2-bit "10" sequence. The acknowledgement bit (As) after the check code can be a 0 if the driver module does not recognize the "10" check code and can be a 1 if the driver module does recognize the "10" check code.

As shown in FIG. 5, bits may be assigned values (1,0) to identify a rail. For example, a first rail (Rail0) may be identified by an address having a first bit (AD5) equal to zero, regardless of the other bits. A second rail (Rail1) may be identified by an address having a first bit (AD5) equal to one and having a second bit (AD4) equal to zero, regardless of the other bits. A third rail (Rail2) may be identified by an address having a first bit (AD5) equal to one and having a second bit (AD4) equal to one, regardless of the other bits. This scheme can use more bits to identify additional rails. One advantage of this technique is its versatility to accommodate a wide range of topologies. For example, the bits other than the rail bits can be used for further distinction. One further distinction that can be handled by the disclosed addressing technique is parallel driver modules.

Figure 6:
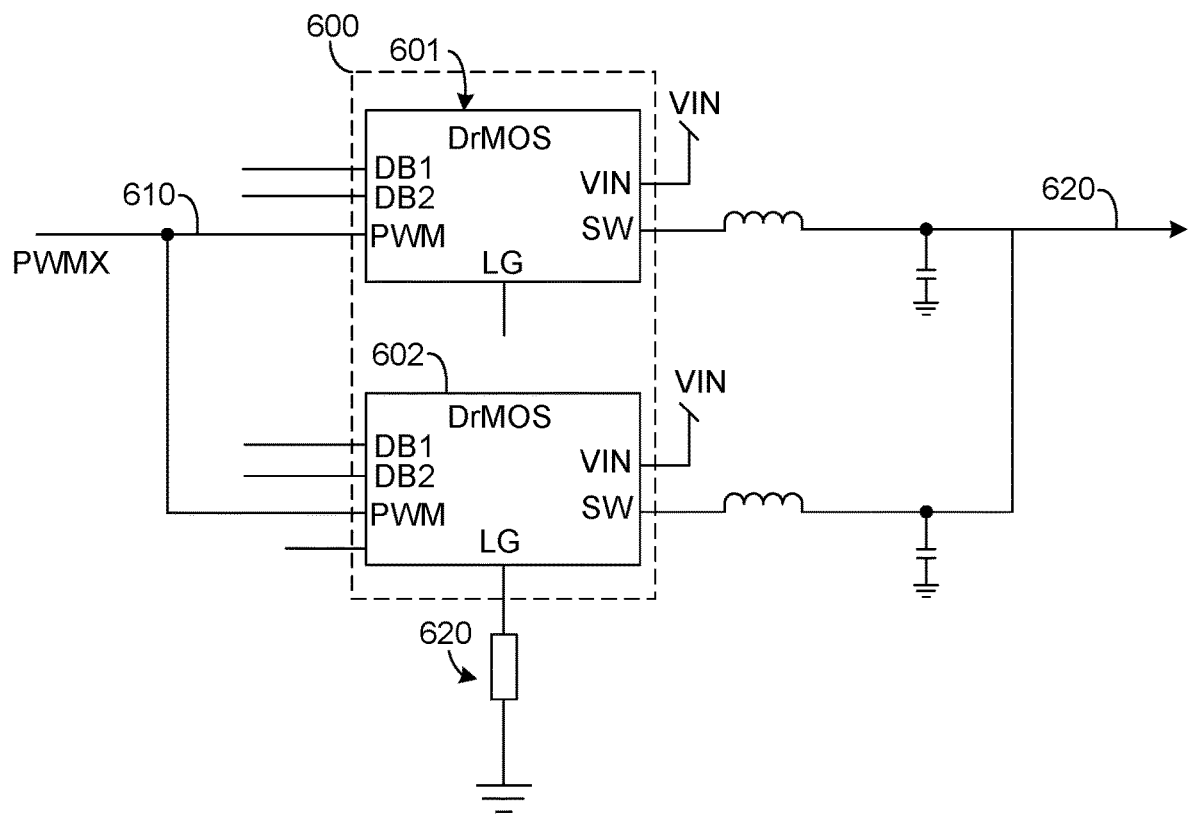
FIG. 6 illustrates parallel driver modules addressed using a strapping bit according to a possible implementation of the present disclosure.

FIG. 6 illustrates parallel driver modules addressed using a strapping bit according to a possible implementation of the present disclosure. As shown the parallel driver modules 600 include a first driver module 601 and a second driver module 602. Both of the driver modules are coupled at their respective PWM pin 201 to the same PWM line 610 (PWMx). Because they share a PWM line, the address assignment process 300 cannot distinguish the driver modules by which PWM port they are coupled to. In this case, the controller may assign an additional bit based on another distinguishing characteristic.

The additional bit may correspond to a voltage on a resistor 216 coupled to a low-side gate pin 209 of the driver module 221. As shown in FIG. 6, the first driver module 601 includes a floating low-side gate pin 209 and the second driver module 602 includes a low-side gate pin 209 that is pulled down by a resistor 620. As a result, the first driver module 601 may see a higher voltage on the low-side gate pin 209 than the second driver module 602.

During an address assignment process 300, the controller may transmit two addresses to the same PWM line 610. The first address in which the additional bit (i.e., strapping bit) is assigned a first value (e.g., 1) can be stored by the first driver module 601 because it has the higher voltage, while the second address in which the additional bit (i.e., strapping bit) is assigned a second value (e.g., 0) can be stored by the second driver module 602 because it has the lower voltage.

Figure 7:
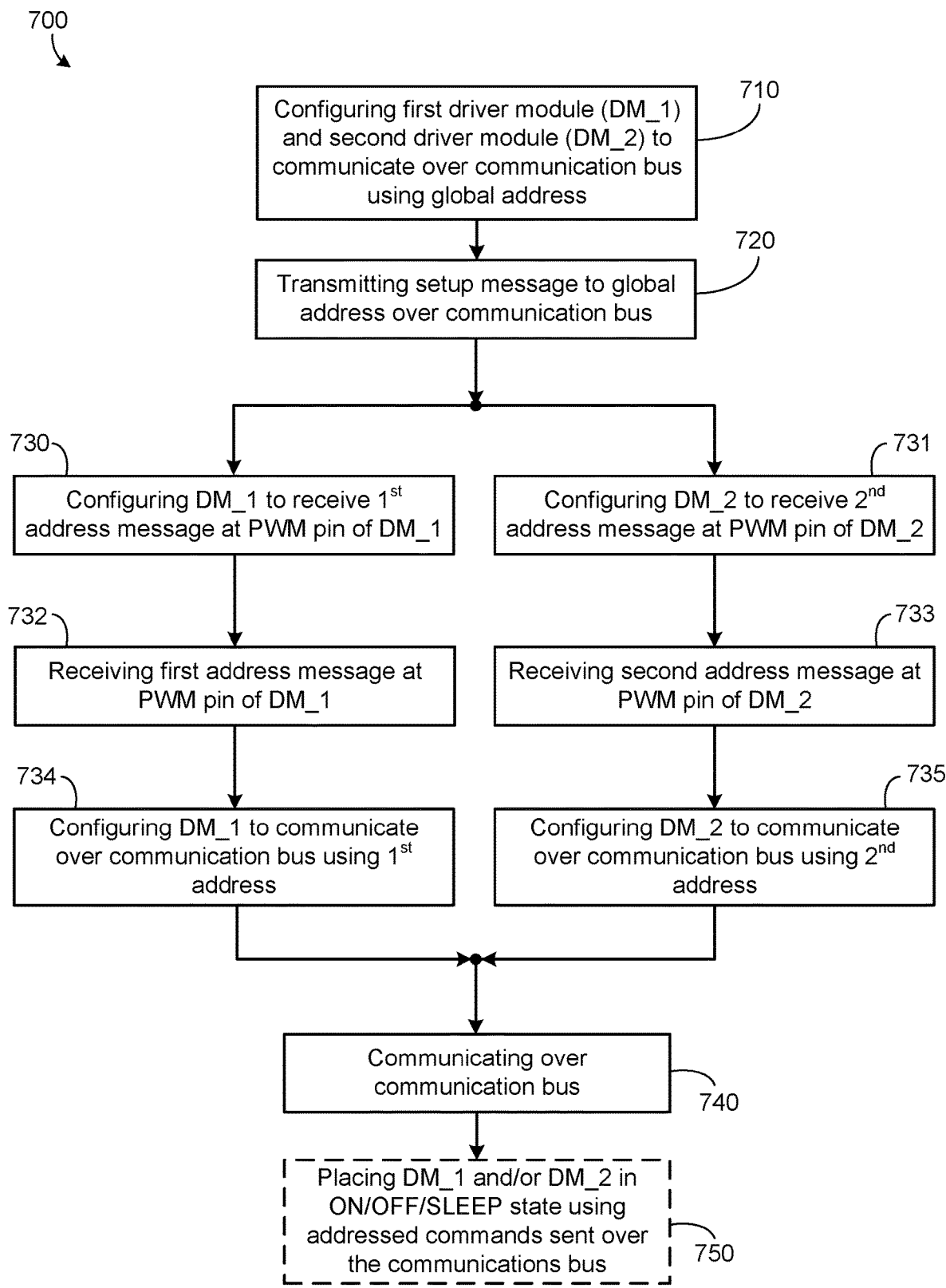
FIG. 7 is a flowchart of a method for communication in a multiphase power stage according to a possible implementation of the present disclosure.

FIG. 7 is a flowchart of a method for communication in a multiphase power stage according to a possible implementation of the present disclosure. Operations (i.e., steps) of the method 700 may be implemented by different devices in the multiphase power stage. For example, computer implemented instructions (e.g., software, firmware, etc.) may be recalled from a non-transitory computer readable medium to configure a processor or other computing circuitry in a controller and/or a driver module to perform the steps described below.

The method 700 includes configuring 710 a first driver module (DM_1) and a second driver module (DM_2) to communicate (e.g., with a controller) over a communication bus using a global address.

The method 700 further includes transmitting 720 (e.g., by a controller) a setup message to the global address over the communication bus. The global address is any address that can be received by DM_1 and DM_2. For example, the global address may be a default address placed in the registers of the driver modules at the time of fabrication. Accordingly, the setup message is received by each driver module (DM_1, DM_2) from the data line of the communication bus.

Upon receipt of the setup message, the first driver module can be configured 730 to receive a first address message at a PWM pin of the first driver module. In other words, instead of receiving data from the data line of the communication bus, the first driver module is configured to (temporarily) receive data from a PWM line feeding the first driver module. Accordingly, the method 700 further includes receiving 732 the first address message at the PWM pin of the first driver module.

Likewise, upon receipt of the setup message, the second driver module can be configured 731 to receive a second address message at a PWM pin of the second driver module. In other words, instead of receiving data from the data line of the communication bus, the second driver module is configured to (temporarily) receive data from a PWM line feeding the second driver module. Accordingly, the method 700 further includes receiving 733 the second address message at the PWM pin of the second driver module.

The method 700 further includes configuring 734 the first driver module to communicate over the communication bus using the first address received at the PWM pin of the first driver module. The configuration may include replacing a default address with the first address in a memory (e.g., register) of the first driver module.

Likewise, the method 700 further includes configuring 735 the second driver module to communicate over the communication bus using the second address received at the PWM pin of the second driver module. The configuration may include replacing the default address with the second address in a memory (e.g., register) of the second driver module.

After the driver modules have been assigned their addresses, communication between the controller and the driver may be returned to the communication bus as before the address assignment. Accordingly, the method 700 includes the first driver module and the second driver module communicating 740 over a communication bus using the first address and the second address, respectively.

After the addresses have been assigned, the controller may communicate with a particular driver module (i.e., per phase communication), with the driver modules of a rail (i.e., per rail communication), or with all modules (i.e., global communication). This communication can allow the controller to enable/disable circuitry in the driver modules for regulation and reporting. This control can facilitate device staging and power saving modes (i.e., states). Accordingly, the method 700 optionally placing 750 the first driver module and/or the second driver module in an ON state (i.e., ON mode), OFF state (i.e., OFF mode) or a SLEEP state (i.e., SLEEP mode) using addressed messages (e.g., addressed commands) communicated over the communication bus.

An increasing concern in power electronics are losses due to the quiescent current of components, such as the driver module. As power demands in a system (e.g., a computing system) are reduced, phases can be disabled (i.e., shed) to reduce switching losses. One problem with this traditional shedding techniques is that the quiescent current of the shed phases may remain high because all phases must monitor an enable line in order to quickly respond to an enable signal. For example, a load may quickly turn to a heavy condition after phases (or rails) are shed for a low load condition, and the multiphase power stage must be able to bring the shed phases (or rails) back online as quickly as possible. The present approach can alleviate this problem through addressed commands transmitted from the controller to the driver modules over the communication bus. For example, the controller may communicate a sleep command to place one or mode driver modules in a sleep state and a wake command to wake (i.e., enable) a driver module from the sleep state using much less quiescent current than previous approaches. When a driver module is in a SLEEP mode it can listen to the bus for its address, otherwise it can ignore all communication and shut down regulation functions (e.g., switching).

The addressed communication may change the states of the driver modules on a per phase, per rail, or global basis. The states of the driver modules may include an ON state, an OFF state, and a SLEEP state.

In the ON state all circuits (e.g., high-side transistor and low-side transistor (switching circuitry)) in the driver module are active and operating to provide a regulated voltage to a rail as described previously. For example, in the ON state, a driver module will be switching either in discontinuous conduction mode (i.e., DCM), when the PWM input toggles between a MID level and a HIGH level or in continuous conduction mode (i.e., CCM) when the PWM toggles between a LOW level and a HIGH level. The driver module will also report thermal status and current information back to the controller for regulation and reporting purposes. For example, a monitored current (Imon) can be reported at a monitor pin continuously. A monitored temperature (Tmon) may be reported to a temperature bus 250 after a request is received on the communication bus 140. A status of the driver module may be reported back on the communication bus upon an addressed request. The controller may transmit an ON command to place any or all of the driver modules of the multiphase power stage in an ON state based on the address of the ON command.

In an OFF state, circuits to drive the high-side transistor 231 and the low-side transistor 232 are deactivated and not powered. These circuits can include the PWM control logic, a level shifter, high-side amplifier 251, and low-side amplifier 252. Additionally, circuitry for current monitoring and thermal fault detection may be deactivated. In the OFF state the driver module is not switching in any mode (DCM, CCM) of operation. The signal at the PWM of a driver module that is OFF may be LOW or MID level with no toggling. The driver module in the OFF state does not report any parameters to the controller. The controller may transmit an OFF command to place any or all of the driver modules of the multiphase power stage in an OFF state based on the address of the OFF command. Waking from an OFF state may take extra time as the circuits are brought online. For example, the current monitoring circuit may be recalibrated as the ON state is entered. The controller may transmit a ON command to move any or all of the driver modules of the multiphase power stage from the OFF state to the ON state based on the address of the ON command.

In a SLEEP state, circuits to drive the high-side transistor 231 and the low-side transistor 232 (i.e., switching circuitry) are deactivated (i.e., inactive, not toggling) but powered so that waking from the SLEEP state is faster than waking from the OFF state. In the SLEEP state, the PWM input is held at a MID level so that the sleeping driver module does not affect the rail voltage. The controller may transmit a SLEEP command (i.e., STANDBY command) to place any, or all, of the driver modules of the multiphase power stage in the SLEEP state based on the address of the SLEEP command. The controller may transmit a ON command to move any or all of the driver modules of the multiphase power stage from the SLEEP state to the ON state based on the address of the ON command.

In a possible implementation a multiphase power stage includes four driver modules and has the capability of delivering 120 A (i.e., 30 A per phase). When the load only requires 20 A, switching all four driver modules is inefficient. In this case, the controller may transmit SLEEP commands to three of the four driver modules. What results is three driver modules in the SLEEP state and one driver module in the ON state. The driver module in the ON state will continue with all circuits active and toggle HIGH and LOW. The other three driver modules will deactivate circuits and will have a PWM input at a MID level so as not to affect the output voltage.

Commands with rail addresses can be used for responding to change in current at one rail. For example, an ON command can be addressed to a rail (i.e., to all driver modules belonging to the rail) to wake the power modules to provide additional current. The addressed (i.e., directed) command approach can be utilized during phase shedding to reduce a quiescent current of the multiphase power stage on a per phase basis to optimize efficiency without affecting performance (e.g., wake time) and without adding extra communication complexity.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for communication in a multiphase power stage, the method comprising:
    transmitting a setup message from a controller to a plurality of driver modules using serial communication over a communication bus;
    configuring, in response to the setup message, the plurality of driver modules to temporarily receive serial communication over respective pulse width modulation (PWM) lines between the controller and the plurality of driver modules;
    transmitting a first address message from the controller to a first driver module of the plurality of driver modules over a first PWM line while transmitting a second address message from the controller to a second driver module of the plurality of driver modules over a second PWM line, the first address message being different from the second address message;
    receiving, at the first driver module, the first address message from the first PWM line, the first address message including a first address;
    configuring the first driver module to use the first address for serial communication over the communication bus;
    receiving, at the second driver module, the second address message from the second PWM line, the second address message including a second address; and configuring the second driver module to use the second address for serial communication over the communication bus.

2. The method according to claim 1, wherein the setup message includes a default address used by the plurality of driver modules.

3. The method according to claim 2, wherein:
configuring the first driver module to use the first address for serial communication over the communication bus includes replacing the default address stored at the first driver module with the first address; and
configuring the second driver module to use the second address for serial communication over the communication bus includes replacing the default address stored at the second driver module with the second address.

4. The method according to claim 1, further including:
transmitting an acknowledgement signal from the first driver module and the second driver module to the controller, the acknowledgement signal indicating that the first address and the second address were received at the first driver module and the second driver module respectively.

5. The method according to claim 1, wherein the communication bus includes a data line and a clock line.

6. The method according to claim 5, further including:
transmitting a clock signal on the clock line of the communication bus; and
transmitting the first address message to the first PWM line and the second address message to the second PWM line in parallel according to the clock signal.

7. The method according to claim 1, wherein:
the first address includes a sequence of address bits unique to the first driver module followed by a sequence of check-code bits; and
the second address includes a sequence of address bits unique to the second driver module followed by the sequence of check-code bits.

8. A multiphase power stage comprising:
a communication bus including a data line and a clock line;
a first driver module coupled to the data line at a first data pin and coupled to the clock line at a first clock pin;
a second driver module coupled to the data line at a second data pin and coupled to the clock line at a second clock pin; and
a controller, coupled to the communication bus, coupled to a first PWM pin of the first driver module, and coupled to a second PWM pin of the second driver module, the controller configured by instructions to:
transmit a setup message over the communication bus to the first driver module and the second driver module, the setup message configuring the first driver module and the second driver module to receive serial communication at the first PWM pin and the second PWM pin respectively; and
transmit, simultaneously, a first address message to the first PWM pin of the first driver module and a second address message to the second PWM pin of the second driver module, wherein the first address message configures the first driver module to use a first address for communication over the communication bus and the second address message configures the second driver module to use a second address for communication over the communication bus.

9. The multiphase power stage according to claim 8, wherein the controller is further configured to:
transmit a clock signal to the clock line of the communication bus while transmitting the first address message and the second address message, the first address message and the second address message being synchronous with the clock signal.

10. The multiphase power stage according to claim 8, wherein the controller is further configured to:
receive, after transmitting the first address message and the second address message, an acknowledgement signal transmitted from the first driver module and the second driver module to the data line of the communication bus.

11. The multiphase power stage according to claim 10, wherein the acknowledgement signal is based on a check code in the first address message received by the first driver module and on the check code in the second address message received by the second driver module.

12. A power stage, comprising:
a plurality of rails, each rail supplied by a plurality of driver modules, the plurality of driver modules configured to communicate over a communication bus according to a default address at a start of an address assignment process; and
a controller coupled directly to respective pulse width modulation (PWM) pins of a plurality of driver modules, the controller configured by instructions to:
transmit a setup message over a communication bus addressed to a default address to configure the plurality of driver modules to temporarily receive data at a PWM pin of each driver module; and
transmit, in parallel, respective unique address messages to the PWM pin of each driver module to configure-replace the default address of each driver module with a unique address to communicate with the controller on the communication bus at an end of the address assignment process, wherein the unique address for each driver module is included in the respective unique address message received each driver module.

13. The power stage according to claim 12, wherein the unique address includes at least one bit to indicate receipt by all of the plurality of driver modules of all of the plurality of rails.

14. The power stage according to claim 12, wherein the unique address includes at least one bit to indicate receipt by all driver modules of a particular rail.

15. The power stage according to claim 12, wherein the unique address includes at least one bit to indicate receipt by a particular driver module of a particular rail.

16. The power stage according to claim 12, wherein a first driver module and a second driver module of the plurality of driver modules are coupled at respective PWM pins to one PWM port of the controller, the first driver module including a strapping resistor configured to generate a voltage at a low-side gate pin.

17. The power stage according to claim 16, wherein the unique address includes a strapping bit corresponding to the voltage at the low-side gate pin of the first driver module.

18. The power stage according to claim 12, wherein the controller is further configured to, after the end of the address assignment process:
communicate, based on the unique address for each driver module, commands that are addressed:
globally to all driver modules of the plurality of driver modules;
selectively to driver modules of a particular rail of the plurality of rails; or individually to a particular driver module of the plurality of driver modules.

19. The power stage according to claim 18, wherein the commands include a sleep command to configure at least one driver module in a SLEEP state, wherein in the SLEEP state, switching circuitry of the at least one driver module is inactive.

20. The power stage according to claim 19, wherein the commands include a wake command to configure the at least one driver module from the SLEEP state to an ON state, wherein in the ON state, switching circuitry of the at least one driver module is active.

* * * * *